United States Patent [19]
Kitayama et al.

[11] Patent Number: 6,124,025
[45] Date of Patent: Sep. 26, 2000

[54] POLYPROPYLENE-BASED FOAMED SHEET

[75] Inventors: Takeo Kitayama; Kaori Tsubouchi, both of Ibaraki; Shigeyoshi Matsubara, Osaka, all of Japan

[73] Assignee: Sumitomo Chemical Company, Limited, Osaka, Japan

[21] Appl. No.: 09/418,319

[22] Filed: Oct. 14, 1999

[30] Foreign Application Priority Data

Oct. 30, 1998 [JP] Japan .................................. 10-310671

[51] Int. Cl.⁷ ....................................................... B32B 5/20
[52] U.S. Cl. ........................ 428/213; 428/218; 428/319.8; 521/79; 521/142
[58] Field of Search .................................... 428/213, 218, 428/319.8; 521/142, 79

[56] References Cited

U.S. PATENT DOCUMENTS 5,116,881  5/1992  Park et al. ............................... 521/143
5,474,841  12/1995  Matsuki ................................. 428/304.4

*Primary Examiner*—Morton Foelak
*Attorney, Agent, or Firm*—Sughrue, Mion, Zinn, Macpeak & Seas, PLLC

[57] ABSTRACT

The present invention provides a polypropylene-based foamed sheet whose expansion ratio is 4 or more times characterized by expansion ratio A of the part (skin layer) up to 20% in each of the seat thickness from both surface of said polypropylene-based foamed sheet and expansion ratio B of part other than said skin layer (core layer) satisfying the following formula (1) and the like $$1.3 \leq B/A \tag{1}$$

The polypropylene-based foamed sheet of the present invention is excellent in the balance of a lightweight properties and rigidity.

6 Claims, 5 Drawing Sheets

POLYPROPYLENE-BASED FOAMED SHEET

BACKGROUND OF THE INVENTION

Field of the Invention

The present invention relates to a polypropylene-based foamed sheet.

Description of the Related Art

A foamed sheet is broadly used for the container, building materials, automobile parts, and the shock absorbing material, etc. Especially, since the polypropylene-based foamed sheet is excellent in rigidity and the thermostability as compared with the polystyrene-based foamed sheet, the demand is increasing in recent years. In particular, the further weight saving is desired from the request of energy saving etc., and the polypropylene-based foamed sheet having a high expansion ratio more is developed. However, the more the expansion ratio of a foamed sheet becomes high, the more the rigidity decreases. Therefore, in the polypropylene-based foamed sheet of the high expansion ratio, the balance of the lightweight properties and rigidity was not yet enough.

SUMMARY OF THE INVENTION

Then, the present inventors of the present invention examined development of the polypropylene-based foamed sheet excellent in the balance of a lightweight properties and rigidity, and completed the present invention.

The present invention provides:
1. A polypropylene-based foamed sheet whose expansion ratio is 4 or more times characterized by expansion ratio A of the part (skin layer) up to 20% in each of the seat thickness from both surface of said polypropylene-based foamed sheet and expansion ratio B of part other than said skin layer (core layer) satisfying the following formula (1).

$$1.3 \leq B/A \quad (1)$$

2. The polypropylene-based foamed sheet according to the above 1, characterized by A and B satisfying following formula (2).

$$1.4 \leq B/A \quad (2)$$

3. The polypropylene-based foamed sheet according to above 1 or 2, characterized by expansion ratio being 5 or more times.
4. The polypropylene-based foamed sheet according to the above 1 or 2, characterized by expansion ratio being 7 or more times.
5. The polypropylene-based foamed sheet according to the above 1 or 2, characterized by the polypropylene-based foamed sheet being non-cross-linkage polypropylene-based foamed sheet.
6. A facing laminating polypropylene-based foamed sheet characterized by laminating a facing material at least on one side of the polypropylene-based foamed sheet according to the above 1 or 2.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE PREFERRED EMBODIMENTS

In the present invention, the procedure described in the A method of JIS-K7112 (underwater replacement method) was used as a measuring method of the expansion ratio. The density d1 of a formed sheet, and the density d0 of the polypropylene-based resin (before foaming) used as the raw material were obtained, and then ratio (d0/d1) was calculated as an expansion ratio of a foamed sheet.

The expansion ratio of the polypropylene-based foamed sheet in the present invention (that is, expansion ratio of the whole foam comprising a skin layer and a core layer) is 4 or more times. Moreover, preferably, the expansion ratio is 5 or more times, and is 7 or more times still preferably from the viewpoint of a lightweight properties. Furthermore, when the part to 20% in each of the sheet thickness from both surfaces of said foamed sheet to the thickness direction of said polypropylene-based foamed sheet (hereafter, it is occasionally described as skin layer), is set to expansion ratio A (that is, average value of the expansion ratios of both skin layer) and the part other than said skin layer in the foamed sheet, that is, part excluding the part from both the surfaces of a foamed sheet to 20% of sheet thickness from the foamed sheet (hereafter, it is occasionally described as core layer) is set to expansion ratio B, the ratio of the expansion ratio of the skin layer (the expansion ratio A) and the expansion ratio of the core layer (the expansion ratio B) of the polypropylene-based foamed sheet in the present invention, i.e., B/A, is 1.3 or more.

Figure 1:
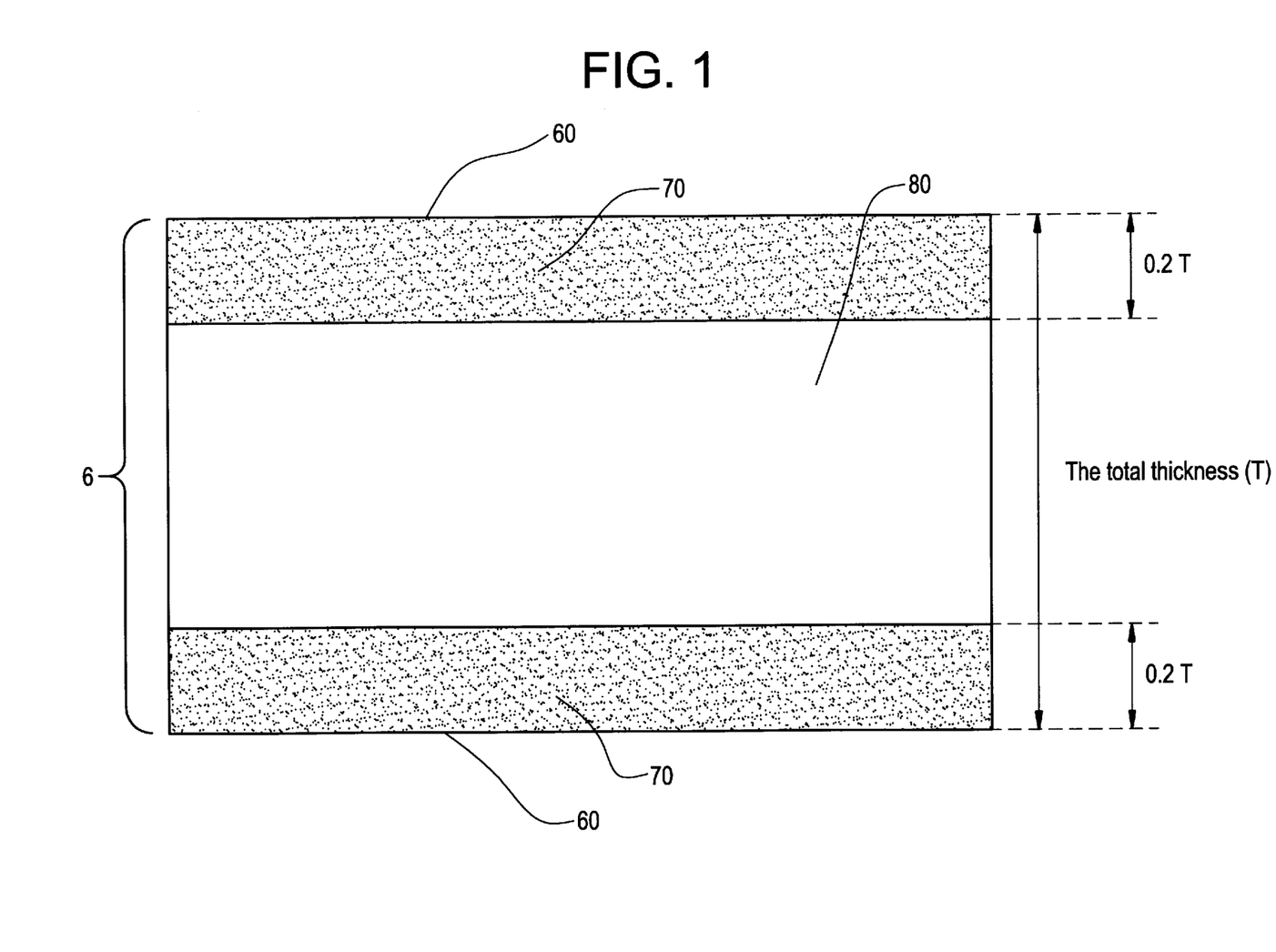
FIG. 1 is a schematic diagram of showing the thickness direction longitudinal section of the polypropylene-based foamed sheet of the present invention.

For example, according to FIG. 1, the concrete method of obtaining the above A and B is explained. On each line equivalent to 20% of the total thickness (T) of polypropylene-based foamed sheet 6, said polypropylene-based foamed sheet 6 is cut from both the surfaces 60 and 60 of the polypropylene-based foamed sheet 6, for example, and the part corresponding to a skin layer 70 and 70 is separated from the polypropylene-based foamed sheet. Expansion ratio of a skin layer 70 and 70 is measured by each in the expansion ratio of a skin layer 70 and 70, and the measured value is averaged to obtain the expansion ratio A of a skin layer 70 and 70. On the one hand, the expansion ratio of a core layer 80 obtained by separating the above-mentioned skin layer 70 and 70 from the polypropylene-based foamed sheet 6 is measured to obtain the expansion ratio B of the core layer 80. In addition, how to measure the expansion ratio of the skin layer or the core layer is the same method as the above-mentioned method. From the viewpoint of rigidity of the foamed sheet, the ratio of expansion ratio A of the skin layer and expansion ratio B of the core layer (B/A) is 1.4 preferably, and is 1.5 or more still preferably. Moreover, although especially the maximum value of B/A is not limited, it is usually three or less and is two or less preferably from the viewpoint of productivity.

The polypropylene-based resin which constitutes the polypropylene-based foamed sheet of the present invention has the crystalline polypropylene-based resin. For example, it may be any of the homopolymer of propylene, the so-called propylene block copolymer by which the ethylene-α-olefine copolymer of noncrystalline was dispersed in the crystalline propylene-based polymer, or the random copolymer which consists of propylene having crystallinity and either of ethylene or alpha-olefin having four or more carbon atoms. Furthermore, the resin composition with which the polypropylene-based resin having crystallinity and other olefin-based resin were mixed may be used. As other olefin-based resin mixed, polyethylene resins such as a low density polyethylene, a high density polyethylene and a straight-chain-like low density polyethylene, a polybutene, and polyolefines which consist of olefines having ten or less carbon atoms, i.e. a poly (4-methyl-1-pentene) etc. are preferable, a polyethylene resin is more preferable especially.

When using the resin composition with which the polypropylene-based resin and other olefin-based resin were mixed, the polypropylene-based resin is a main component, the ratio of the polypropylene-based resin in said resin composition is 50% by weight or more, and 60% by weight or more is especially preferable from the viewpoint of rigidity and thermostability of the foamed sheet obtained.

As for polypropylene-based resin, the crystalline propylene-based polymer whose the melting strength was improved is preferable. The propylene-based polymer whose the melting strength was improved can enumerate the propylene-based polymers obtained by the procedure of carrying out the polymerization of the component from which molecular weight differs in many stages, the procedure using a specific catalyst-based, or the procedure of performing post treatments such as a cross linkage to a propylene-based polymer, for example. In these, the non-cross-linkage polypropylene-based resin with which a cross linkage is not constructed is preferable from the viewpoint of recyclability of the foamed sheet obtained. Moreover, the propylene-based polymer obtained by the procedure of carrying out the polymerization of the component from which molecular weight differs in many stages is preferable from the viewpoint of productivity.

The above-mentioned polypropylene-based resin may contain various of additives usually used, such as fillers (a talc, etc.), a pigment, an antistatic agent, and an antioxidant.

Figure 2:
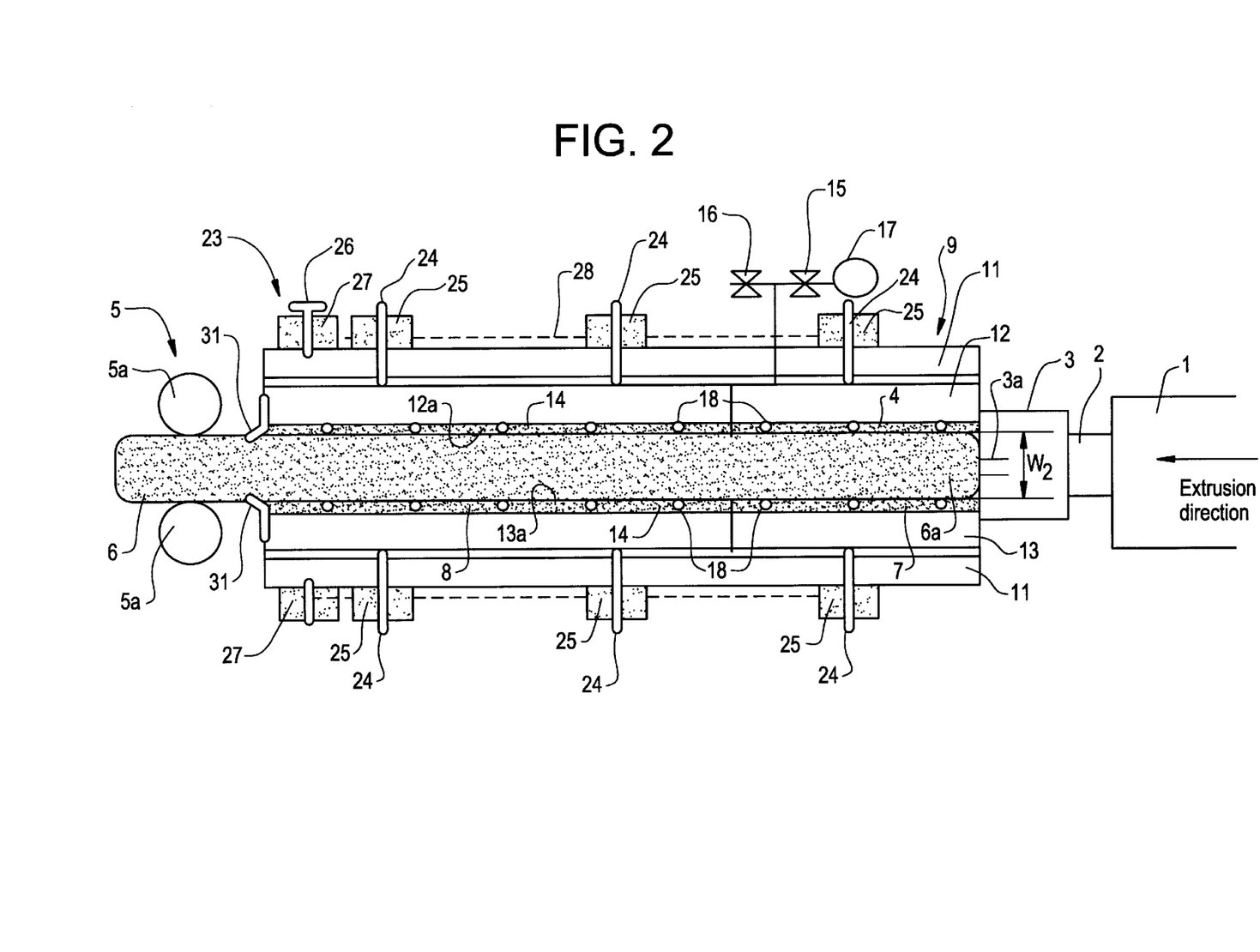
FIG. 2 is a cross-sectional schematic diagram of a part of manufacturing installation used for manufacture of the polypropylene-based foamed sheet of the present invention.

The method of producing the polypropylene-based foamed sheet of the present invention can be manufactured by the extrusion foaming procedure using following apparatus, for example. A production apparatus is shown in FIG. 2. The production apparatus is equipped with an extruder 1, a head part 2, a dies 3, a decompression chamber 4, and a take-off unit 5. The decompression chamber 4 is formed in the inside of a forming part 9. The extruder 1 extrudes the mull matter obtained by the melting and the mull of a foaming agent and the polypropylene-based resin in the direction of head 2, at the temperature beforehand set up according to the polypropylene-based resin and foaming agent used. When the mull of the foaming agent and the polypropylene-based resin needs to be performed at low temperature, the extruder 1 has single-spindle structure preferably. Moreover, the foaming agent used for the present invention does not have a particular restriction, and can use various foaming agents such as a physical foaming agent and a chemistry foaming agent.

Furthermore, the setting temperature of the extruder 1 is usually set up so that the temperature of the melten polypropylene-based resin (mull matter) in near the outlet of the extruder 1 may become 180° C. or less, since the gas omission is generated easily when the temperature of the melten polypropylene-based resin exceeds 180° C.

The head part 2 is installed in the outlet of the extruder 1, and is a head part which uses the screen mesh used for a usual extrusion. However, screen mesh does not need to be used when the shearing heating of the polypropylene-based resin used is remarkable.

The dies 3 is a sheet dies which process the foamble polypropylene-based resin element extruded from the extruder 1 through the head part 2 into like the sheet. Usually, the sheet dies has the structure in which temperature and tension adjustment are possible. In addition, the sheet-like material extruded from the dies 3 may be described as a sheet-like foamble polypropylene-based resin body below. The take-off unit 5 is installed from the viewpoint of the operativity in the case of producing the polypropylene-based foamed sheet continuously, which is set up on the exit side of the decompression chamber 4 so that a polypropylene-based foamed sheet 6 may be taken over from the exit side of the decompression chamber 4 mentioned later. The unit which consisted of pairs of one or more of roll 5a in which can carry out the nip of the polypropylene-based foamed sheet 6 is suitable for the take-off unit 5. Furthermore, the structure which can regulate temperature with cooling water is preferable. The rolls 5a and 5a which are a pair and have countered are movable in the direction which narrows those intervals, and the direction to extend. For example, these rolls 5a and 5a are constituted so that it may move in connection with the movement of a movable upper wall part 12 and a movable lower wall part 13 mentioned later. When installing the take-off unit 5, although the take-off speed is suitably set up with the expansion ratio and thickness of the polypropylene-based foamed sheet 50, cooling velocity, the used polypropylene-based resin, etc., it is usually 1—3 m/min. As for the method of producing the polypropylene-based foamed sheet, the continuous type manufacture procedure is suitable. Moreover, it is suitable also by the so-called batch type manufacture procedure of producing the foamble polypropylene resin sheet of the desired size, placing the foamble polypropylene-based resin sheet to the decompression chamber 4, and producing the polypropylene-based foamed sheet having a desired expansion ratio like the procedure of mentioning later.

The decompression chamber 4 exposes the sheet-like foamble polypropylene-based resin extruded from the dies 3 under a reduced pressure, and carries out the foaming of it further. The said decompression chamber 4 has the structure which can cool the said sheet-like foamble polypropylene-based resin, after carrying out the foaming of the sheet-like foamble polypropylene-based resin further. The decompression chamber 4 can usually be divided into two zones, for example, the decompression chamber inlet side is a foaming zone 7 which has the mechanism to carry out the foaming of the sheet-like foamble polypropylene-based resin extruded from the dies under a reduced pressure, and the decompression chamber outlet side is a cooling zone 8 which has the mechanism to carry out the cooling solidification of the sheet-like foamble polypropylene-based resin, however, not both zones need to be strictly divided with a baffle plate etc. Moreover, in an above-mentioned batch type manufacture procedure, it may be the structure which serves both as a foaming zone and a cooling zone without dividing into two zones. Although the cooling procedure is not especially limited, it is usually carried out by letting a refrigerant pass on the cooling-water way 18. A refrigerant and its temperature are selected according to the sheet-like foamble polypropylene-based resin and the cooling temperature of the desire to a polypropylene-based foamed sheet. Usually, water is used from the viewpoint of safety. Cooling temperature does not need to be fixed through the decompression chamber 4, and may have the thermal gradient applied to the outlet from the inlet.

The reduced pressure of the decompression chamber 4 is carried out with a vacuum pump 17 connected to the foaming zone 7 part through an inside wall part 14 which has evacuation aperture prepared in the foaming zone 7 and the cooling zone 8, respectively. Adjustment of the degree of reduced pressure is performed by a vacuum pressure regulating valve 15 and a vacuum breaking valve 16. A vacuum pressure regulating valve and a vacuum breaking valve may be used together by adjustment of the degree of reduced pressure, and it may be regulated by either. In addition, although the foaming zone 7 and the cooling zone 8 carry out evacuation simultaneously with one vacuum pump 17 here, it is also good to have a structure of regulating the degree of reduced pressure of both the zones 7 and 8, respectively by installing a vacuum pump in the cooling zone 8 separately. Moreover, the structure where the degree of reduced pressure is adjusted by installation of the pressure regulating valve to the evacuation lines to each is preferable. A usual pressure regulating valve is used as a pressure regulating valve. The type which controls the inhalation pressure of a pump while changing the degree of opening of the valve through a pressure detector and a transmitter, and the type which carries out pressure control by itself while acting as the monitor of the pressure gauge etc. are used preferably. The expansion ratio of the polypropylene-based foamed sheet 6 is determined according to a desired expansion ratio by choosing suitably the amount of addition of a foaming agent and a foaming assistant, the pressure in the decompression chamber 4, the interval $W_2$ of the wall surface 12a and 13a, etc. For example, even if the amount of foaming agent addition and the interval $W_2$ of wall surface 12a and 13a are the same, it is enabled to grow up a bubble more by making the pressure in the decompression chamber 4 low (that is, the differential pressure with an atmospheric pressure greatly), thereby the expansion ratio increases.

As for the pressure in the decompression chamber 4 (hereafter, it is described as a degree of reduced pressure which shows a different amount between the pressure in the decompression chamber 4 and an atomospheric pressure), it is usually preferable to reduce the pressure to about 200 or more mmHgs lower than an atmospheric pressure, it is more preferable to reduce the pressure to 300 or more mmHgs lower than an atomosheric pressure, and it is more preferable to 350–700 or more mmHgs lower than an atomospheric pressure.

For example, the polypropylene-based foamed sheet 6 whose expansion ratio is 4 times can be manufactured by adding a compound foaming agent (a polymerization ratio: sodium hydrogencarbonate / azodicarboxylic amide / zinc oxide) of 1.0 weight part to the above-mentioned resin into the mixture of polypropylene and polyethylene (mixing-ratio:polypropylene / polyethylene=70/30% by weight) as polypropylene-based resin, and carrying out extrusion of this to the decompression chamber 4 of degree of reduced pressure 300 mmHg. Furthermore, if the amount of addition of a foaming agent is changed into 3.5 pts.wt., 6.0 pts.wt. and 8.5 pts.wt., the polypropylene-based foamed sheet 6 which has 5 times, 6 times and 7 times of expansion ratio can be obtained. Next, the forming part 9 and the decompression chamber 4 are explained in detail. The forming part 9 is equipped with a movable wall drive apparatus 23 for moving the movable upper wall part 12 and the movable lower wall part 13. In order that this movable wall drive apparatus 23 is constituted, the inferior extremity part of two or more screws 24 installed by penetrating an outer wall part 11 in the vertical direction is connected to the upper surface of the movable upper wall part 12. The part projected from the outer wall part 11 of the screw 24 is screwed in the internal thread part formed in a sprocket 25. These sprockets 25 are installed rotatably on the upper surface of the outer wall part 11. Moreover, a handle 26 which can be rotated is installed on the upper surface of the outer wall part 11, and as shown in FIG. 2, a toothed belt 28 is hung on this handle 26, for example. In addition, a chain may be replaced with the belt 28. In the same way, the screw 24, the sprocket 25, a gear 27, and the belt 28 are installed in the undersurface side of the movable lower wall 13. However, since the handle 26 is not installed in this undersurface side, the turning of the handle 26 of the upper surface side is transmitted to the sprocket 27 of the undersurface side according to the drive transfer organization. In addition, the movable wall drive apparatus 23 can be installed independently on an undersurface side like the upper surface side, and the movable upper part 12 and the movable lower wall part 13 can be moved by the individual handle 26, i.e., movable wall drive apparatus 23. According to the above-mentioned organization, the movable upper wall part 12 and the movable lower wall part 13 can be simultaneously moved up and down by turning the handle 26. In this case, the movable upper wall part 12 and the movable lower wall part 13 moves in the opposite direction. Thereby, the regulation of the height of the decompression chamber 4 equivalent to the interval of the wall surface 12a of the movable upper wall part 12 and the wall surface 13a of the movable lower wall part 13, i.e., the thickness of the polypropylene-based foamed sheet 6, is attained. Furthermore, as for the transference of the above-mentioned movable upper wall part 12 and the movable lower wall part 13, being carried out where parallel are maintained mutually is preferable, without the movable upper wall part 12 and the movable lower wall part 13 inclining in the extrusion direction and the direction of any of the width direction of the polypropylene-based foamed sheet 6. Moreover, in the embodiment of this example, generally, although the transfer distance of the wall surface 12a of the movable upper wall part 12 and the wall surface 13a of the movable lower wall part 13 to the main position of the thickness direction of the polypropylene-based foamed sheet 6 in die lip 3a is the same, it may change with conditions. Furthermore, not only the structure of the above-mentioned screw type but the above-mentioned movable wall drive apparatus 23 can use suitably well-known structure, such as type which used the hydraulic cylinder. In addition, in the embodiment of this example, although used as the structure in which the movable upper wall part 12 and the movable lower wall part 13 were installed, only either may be installed as a movable thing.

In a continuous type manufacture procedure, it is preferable to use a seal material 31 for the outlet part of the decompression chamber 4, since it corresponds to various size of the polypropylene-based foamed sheet. It is especially preferable to use something of wiper blade form as seal material 31. Wiper blade form here is the beltlike seal material which bent in the extrusion direction of the polypropylene-based foamed sheet 6. It is preferable to use the said wiper blade form seal material 31 for the seat thickness direction and the width direction, and it can be used only for one either of the thickness direction or the width direction. Furthermore, it may be used only for one either of the upper or lower sides of the thickness direction, or only one for either of right or left of the width direction. Seal material which is soft, and has the flexibility, and is formed of, for example, rubber is used preferably. In the decompression chamber 4, the foaming zone 7 is a zone for carrying out the high foaming of the sheet-like foamble polypropylene-based resin 6a which was regulated to the temperature suitable for the foaming and extruded from the dies 3. Pressure is reduced in this zone. The foaming zone 7 will be in the status that it spread at a stretch at the interval W2 of both wall surfaces 12a and 13a, to the opening thickness of die lip 3a during operation of continuous manufacture procedure for polypropylene-based foamed sheet 6. The evacuation of the foaming zone 7 is performed through the structural member which has the evacuation aperture installed all over or a part of wall surrounding the foaming zone 7. The above-mentioned evacuation may be performed by reducing the pressure to the thickness direction of sheet-like foamble polypropylene-based resin 6a, to a direction (the width direction) perpendicular to the above-mentioned thickness direction, or to these both directions. Pressure reduction to the thickness direction is preferable. Furthermore, preferably, an evacuation aperture with a diameter of 20 mm or less is prepared in the both ends of the above-mentioned width direction in the movable upper wall part 12, and pressure reduction is carried out in the above-mentioned thickness direction. When the diameter of the evacuation aperture is 20 mm or more, it comes to get the melting resin etc. blocked frequently, and taking-over operation of the thermoplastic resin foamed sheet 6 by the take-off unit 5 may stop. In the embodiment of this example, the inside wall part 14 of the movable upper wall part 12 and the movable lower wall part 13 is formed in the structural member having an evacuation aperture. As this structural member, porous material structural members, such as a sintered alloy and porous electrocasting shells, are used especially preferably. Electrocasting which airhole H has the structure which spreads greatly on the reverse side, and the number of apertures is usually 3–7 pieces/cm$^2$, and is 3–5 pieces/cm$^2$ preferably is suitable for the porous electrocasting shells which are one of porous material members. They have the characteristic that breathing resistance is also low and a clogging seldom happens. For example, porous electrocasting which is the electrocasting type performed a metal inversion by carrying out thick wall plating of the metals, such as nickel, at a model can be enumerated. The evacuation aperture of the above-mentioned inside wall part 14 is at least 100 micrometers or less, is 50 micrometers or less preferably, and is 30 micrometers or less still preferably. Since the additive, the melten resin and the disassembled resin in the used thermoplastic resin produce a clogging among the evacuation aperture of the inside wall part 14 when the vacuum exclusion aperture is large, in order to maintain the target degree of reduced pressure, the large-scale vacuum pump 17 is needed. Moreover, the inside wall part 14 located in the foaming zone 7 is maintained by predetermined temperature with cooling water which flows the cooling-water way 18 embedded among this inside wall part 14. When a metal with a high thermal conductivity is used for the material of the inside wall part 14, the cooling effect increases. The cooling-water way 18 may be a water-way which cools the foaming zone 7 whole with one line. However, in order to maintain the foaming status of sheet-like foamble polypropylene-based resin 6a good under a reduced pressure, the structure which installs two or more lines extended respectively independently in the width direction of sheet-like foamble polypropylene-based resin 6a so that it may stand in a line in the extrusion direction is preferable. Furthermore, if temperature adjustment is possible, especially a method to regulate the temperature of the foaming zone 7 does not have restriction. For example, the structure which blows air into the foaming zone 7 is also possible. If the evacuation which is excellent in the entrainment of air in the foaming zone 7 is performed when adopting this structure, the degree of reduced pressure of the decompression chamber 4 whole is maintainable.

Figure 3:
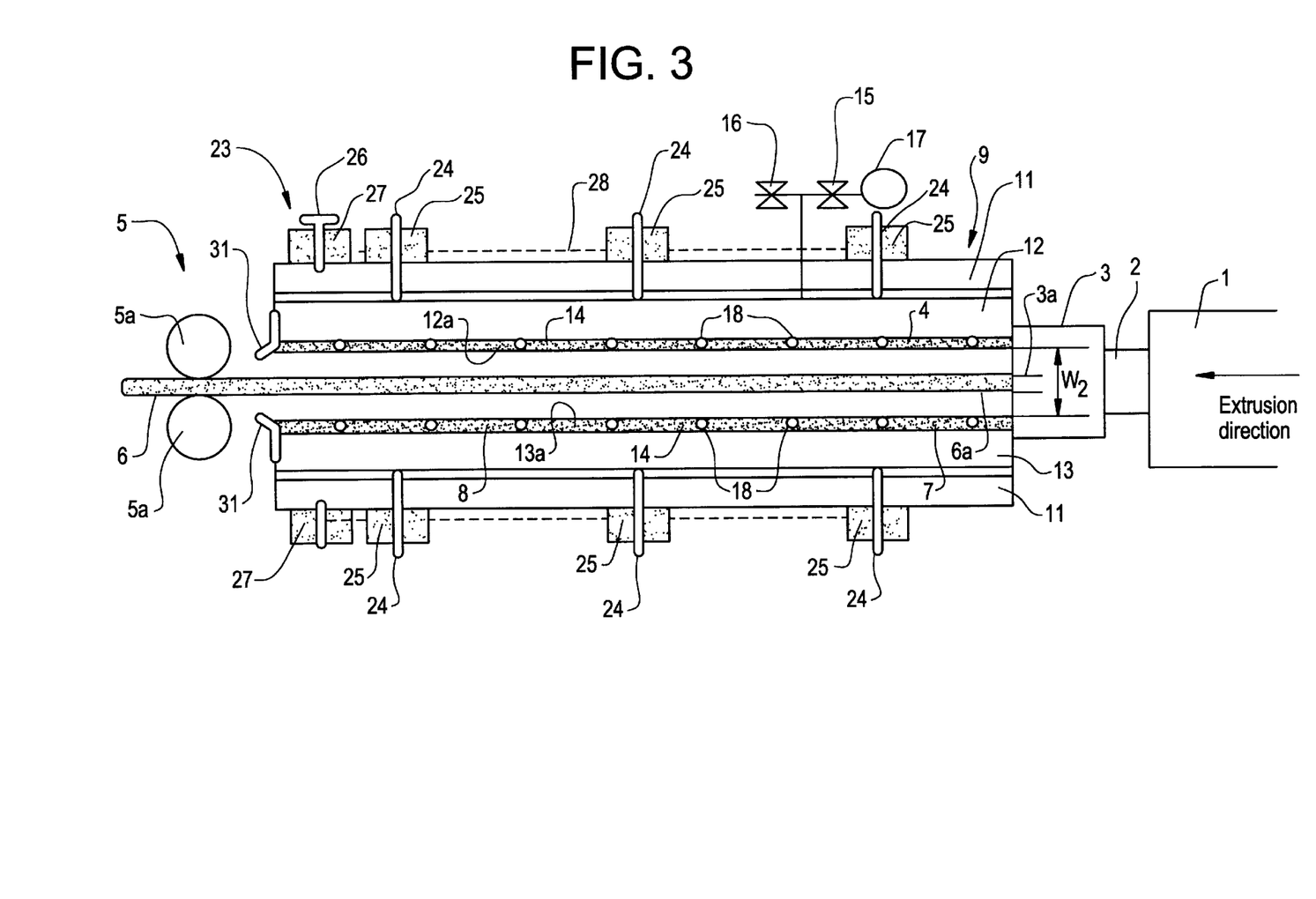
FIG. 3 shows the first process in an example of the manufacture procedure of the polypropylene-based foamed sheet of the present invention.
Figure 4:
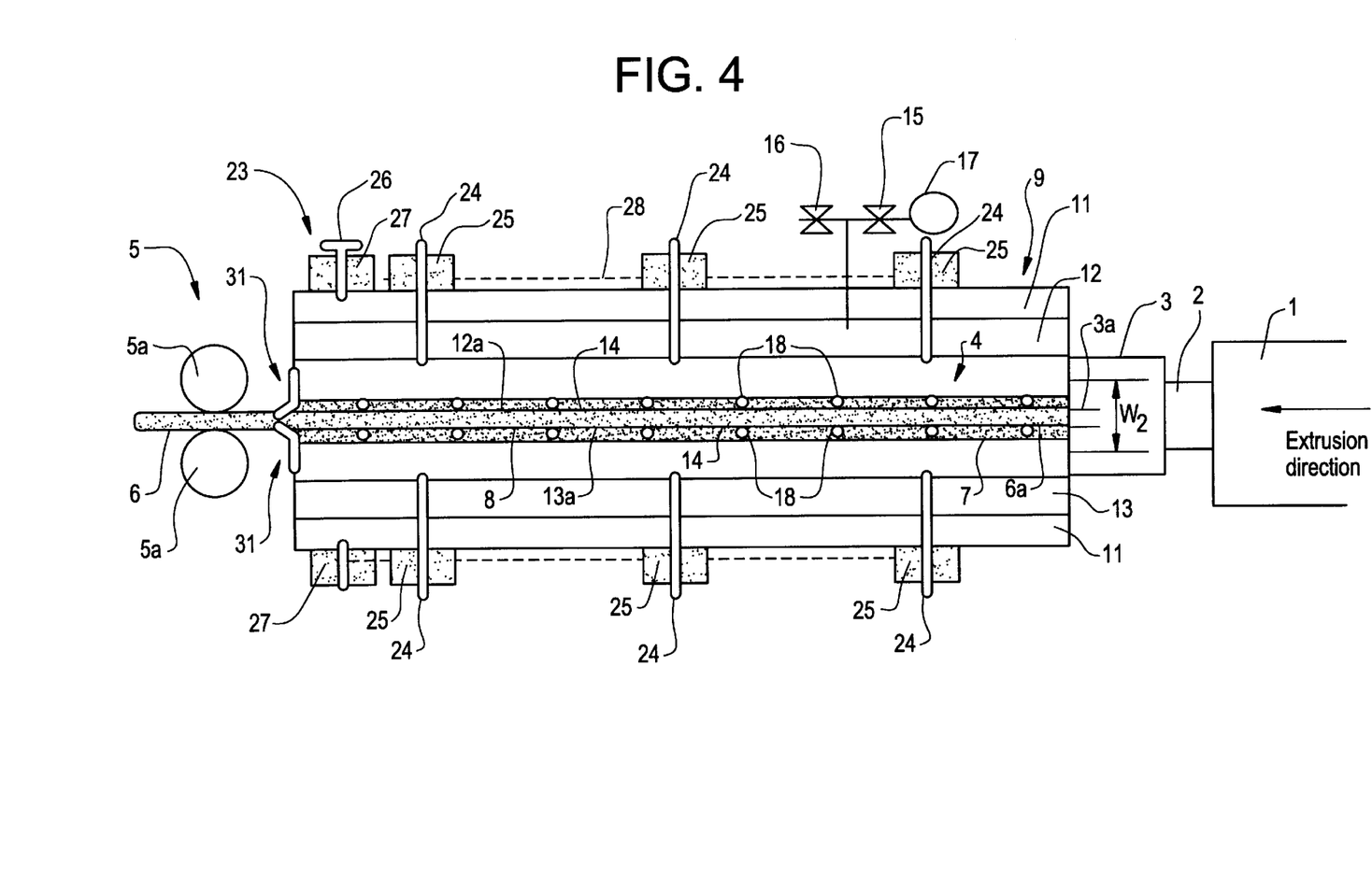
FIG. 4 shows the second process in an example of the manufacture procedure of the polypropylene-based foamed sheet of the present invention.

Although the continuous manufacture procedure of the polypropylene-based foamed sheet of the present invention is concretely explained by the following for an example, the above-mentioned manufacture procedure like a batch can be performed in the same way. First, the foaming agent and the polypropylene-based resin are carried out a melting and a mull by the extruder 1, and then it is extruded in the shape of a sheet from the dies 3. As shown in FIG. 3, in a production apparatus, at this time, the movable upper wall part 12 and the movable lower wall part 13 are put side by side by the status that the movable upper wall part 12 went up and the movable lower wall part 13 came down with the movable wall drive apparatus 23 beforehand, and the interval of the wall surfaces 12a and 13a is moved into the status that it extended rather than the thickness of sheet-like foamble thermoplastic resin 6a. Sheet-like foamble polypropylene-based resin 6a extruded from the dies 3 passes through the decompression chamber 4, and will be in the status that taking over is possible by the take-off unit 5. At this time, opposite roll 5a is in the status that the interval was narrowed, in accordance with the thickness of sheet-like foamble polypropylene-based resin 6a. Next, performing continuous extrusion of sheet-like foamble polypropylene-based resin body 6a, as shown in FIG. 4, the movable upper wall part 12 and the movable lower wall part 13 are moved so that the interval of the wall surfaces 12a and 13a may narrow to $W_1$ with the movable wall drive apparatus 23.

Figure 5:
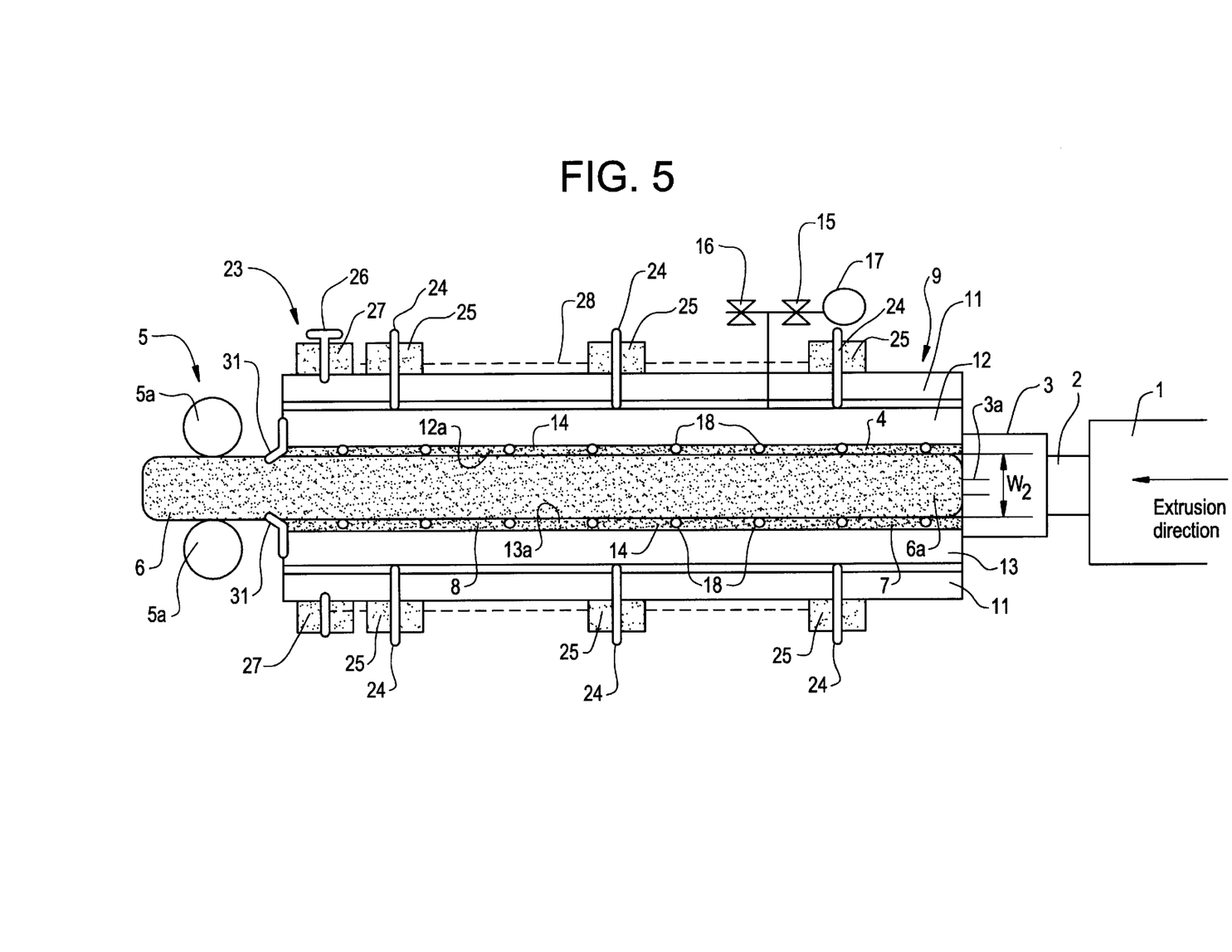
FIG. 5 shows the third process in an example of the manufacture procedure of the polypropylene-based foamed sheet of the present invention.

The above-mentioned interval $W_1$ corresponds to sheet-like foamble polypropylene-based resin body 6a extruded from the dies 3 in the status that the pressure of the decompression chamber 14 is not reduced. In this status, since the end of the seal material 31 fully arrives at the surface of sheet-like foamble polypropylene-based resin body 6a and covers the outlet of the decompression chamber 4, the decompression chamber 4 will be in the status in which a reduced pressure is possible. At this time, the seal material 31 can touch the surface of sheet-like foamble polypropylene-based resin 6a in the status that it curved and bent to the transfer direction side of sheet-like foamble polypropylene-based resin 6a. Then, while the reduced pressure of the inside of the decompression chamber 4 is performed to reduce the pressures to 100 or more mmHgs lower than an atmospheric pressure, as shown in FIG. 5, the movable upper wall part 12 and the movable lower wall part 13 are moved so that the interval of the wall surfaces 12a and 13a may spread to $W_2$ with the movable wall drive apparatus 23. The above-mentioned interval $W_2$ can correspond to the thickness of desire of the polypropylene-based foamed sheet 6 to manufacture, and this interval $W_2$ can be changed optionally. Furthermore, the maximum of the above-mentioned degree of reduced pressures is 700 or less mmHgs preferably. In such a setup, the taking over of the polypropylene-based foamed sheet 6 from the decompression chamber 4 is performed smoothly.

By the above-mentioned reduced pressure operation, the foaming of the sheet-like foamble polypropylene-based resin 6a is further carried out by passing through the foaming zone 7, and the polypropylene-based foamed sheet 6 is obtained. The cooling solidification of this polypropylene-based foamed sheet is performed by passing through the continuing cooling zone, and it is taken over by the take-off unit 5. When manufacturing the polypropylene-based foamed sheet 6 continuously, while the reduced pressure of the decompression chamber 4 is done as mentioned above, operation of manufacture procedure in the status that the interval of wall surface 12a and 13a was fixed to $W_2$ is performed continuously. Besides, in this production apparatus, die lip 3a of the dies 3 may be the constitution projected into the inlet part of the decompression chamber 4. If it is made such structure, since a part of sheet-like foamble polypropylene-based resin 6a extruded from the dies 3, i.e., die lip 3a, will enter for example, between the movable upper wall part 12 or the movable lower wall part 13, and the dies 3 in the status that the interval of the wall surfaces 12a and 13a was narrowed, the situation which causes trouble to the drawer of sheet-like foamble polypropylene-based resin 6a can be prevented.

In the polypropylene-based foamed sheet of the present invention, in order to make it the range which mentioned above the ratio of expansion ratio A of a skin layer, and expansion ratio B of a core layer, that is, B/A, a foaming velocity and a cooling velocity until the polypropylene-based foamed sheet is made from the sheet-like foamble polypropylene-based resin are selected suitably. More specifically, in the continuous type manufacture procedure, a take-off speed and cooling temperature should just be selected suitably, for example. Moreover, in a batch type manufacture procedure, cooling temperature, a cool time and reduced pressure time should just be selected suitably, for example.

In addition, the facing material laminating polypropylene-based foamed sheet with the beautiful aspect which has the further high rigidity and is excellent in the balance of a lightweight properties and rigidity is obtained by laminating a facing material at least on one side of the polypropylene-based foamed sheet obtained by the present invention. Although the facing material should just use a well-known thing according to a use, metal scute such as an aluminium, and a iron and the like, and a thermoplastic resin sheet, a thermoplastic resin film, a thermoplastic resin decorating sheet, a thermoplastic resin decorating film, a thermoplastic resin foamed sheet, paper, a synthetic paper, a nonwoven fabric, a fabric cloth, a carpet, etc. are listed, for example. The procedure to laminate these facing materials will not be limited especially if the adhesion of facing material and the foamed sheet is good. For example, the method of laminating by applying adhesives to the surface of the foamed sheet, and the method of laminating with a foamed sheet by using the facing material which the adhesion resin film laminated and making the adhesion resin film heat and melt etc. are included.

According to the present invention, the polypropylene-based foamed sheet excellent in the balance of a lightweight properties and rigidity can be provided. In addition, the facing laminating polypropylene-based foamed sheet of high rigidity or the facing laminating polypropylene-based foamed sheet with the beautiful aspect excellent in the balance of a lightweight properties and rigidity etc. can be obtained by laminating a facing material at least on one side of the polypropylene-based foamed sheet of the present invention. Such the polypropylene-based foamed sheet or the facing laminating polypropylene-based foamed sheet can be used for various purpose, such as a container, building materials, and automobile parts, and the shock absorbing material, etc..

EXAMPLE

The rate of a mixing ratio was made into polypropylene:polyethylene=70:30% by weight, using the mixture of polypropylene and polyethylene as polypropylene-based resin in this example. Moreover, 3.5 pts.wt. addition of the compound foaming agent (the weight ratio of the sodium hydrogencarbonate / azodicarboxylic amide / zinc oxide of that is 9/0.5/0.5) 30 wt by weight master batch (polyethylene base) was added as a foaming agent and a foaming assistant.

The production apparatus shown in FIG. 2 was used for manufacture of the polypropylene-based foamed sheet 6 here. In this production apparatus, the 65 mmφ extruder of a single spindle was used as the extruder 1. The setup of each part in this production apparatus is shown in Table 1. Furthermore, the cylinder temperature in this table is the cylinder temperature of the extruder 1.

TABLE 1

| | |
|---|---|
| Cylinder temperature | 165° C. |
| Dies temperature | 175° C. |
| Foaming zone temperature | 60° C. |
| Cooling zone temperature | 30° C. |
| The degree of reduced pressure of the decompression chamber (pressure difference) | 300 mmHg |
| An apparent frictional coefficient | 0.32 |
| Taking-over velocity | 8 mm/sec |
| The interval $W_2$ of wall surface 12a and 13a | 7 mm |

From the polypropylene-based foamed sheet 6 manufactured using the process apparatus of such a polypropylene-based foamed sheet, the 1 cm (the width direction of the sheet)×1 cm (the extrusion direction of the sheet) region was cut. As shown in FIG. 1, each of these samples were cut on each line equivalent to 20% of the total thickness of said polypropylene-based foamed sheet 6 from both the surfaces 60 of the polypropylene-based foamed sheet 6, and each expansion ratio of the core layer and the skin layer was measured according to the A method of JIS-K7112. Furthermore, the expansion ratio of the skin layer is the average of the expansion ratio of both skin layers. A measurement result is shown in Table 2.

The measurement result of the expansion ratio of the polypropylene-based foamed sheet manufactured by the usual extrusion foaming method as an example of comparison was shown. A usual extrusion foaming method is the foaming procedure to which the foaming of the polypropylene-based foaming resin which performed the melting and the mull in the extruder was performed by extruding in an atmospheric pressure from the dies.

TABLE 2

|  | Expansion ratio | An average of A of a skin layer expansion ratio | Core layer expansion ratio B | B/A |
|---|---|---|---|---|
| Example | 5.0 | 4.2 | 6.4 | 1.5 |
| Comparative Example | 2.3 | 2.0 | 2.4 | 1.2 |

In a polypropylene-based foamed sheet, when the expansion ratio a of the skin layer and the expansion ratio B of the core layer of the polypropylene-based formed sheet become B/A≧1.3 like the above-mentioned example, it proves that the polypropylene-based foamed sheet excellent in the balance of a lightweight properties and rigidity is obtained.

[Reference numerals]
1 Extruder
2 Head Part
3 Dies
3a Die lip
4 Decompression Chamber
5 Take-off Unit
5a roll
6 Polypropylene-based Foamed Sheet
6a Sheet-like foamble polypropylene-based resin
7 Foaming Zone
8 Cooling Zone
9 Forming Part
11 Outer Wall Part
12 Movable Upper Wall Part
12a Wall surface
13 Movable Lower Wall Part
13a Wall surface
14 Inside-Wall Part
15 Vacuum Pressure Regulating Valve
16 Vacuum Breaking Valve
17 Vacuum Pump
18 Cooling-Water Way
23 Movable Wall Drive Apparatus
24 Screw
25 Sprocket
26 Handle
27 Gear
28 Belt
31 Seal material
60 The surface of a polypropylene-based foamed sheet
70 Skin Layer
80 Core Layer

What is claimed is:

1. A polypropylene-based foamed sheet whose expansion ratio is 4 or more times characterized by expansion ratio A of the part (skin layer) up to 20% in each of the seat thickness from both surfaces of said polypropylene-based foamed sheet and expansion ratio B of part other than said skin layer (core layer) satisfying the following formula (1).

$$1.3 \leq B/A \qquad (1).$$

2. The polypropylene-based foamed sheet according to claim 1, characterized by A and B satisfying following formula (2)

$$1.4 \leq B/A \qquad (2).$$

3. The polypropylene-based foamed sheet according to claims 1 or 2, characterized by expansion ratio being 5 or more times.

4. The polypropylene-based foamed sheet according to claims 1 or 2, characterized by expansion ratio being 7 or more times.

5. The polypropylene-based foamed sheet according to claims 1 or 2, characterized by the polypropylene-based foamed sheet being non-cross-linkage polypropylene-based foamed sheet.

6. A facing laminating polypropylene-based foamed sheet characterized by laminating a facing material at least on one side of the polypropylene-based foamed sheet according to claims 1 or 2.

* * * * *